United States Patent
Tezuka et al.

(10) Patent No.: US 9,071,174 B2
(45) Date of Patent: Jun. 30, 2015

(54) MOTOR CONTROL DEVICE CONTROLLING A PLURALITY OF MOTORS THAT DRIVE ONE DRIVEN BODY

(71) Applicant: FANUC CORPORATION, Minamitsuru-gun, Yamanashi (JP)

(72) Inventors: Junichi Tezuka, Yamanashi (JP); Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 33 days.

(21) Appl. No.: 14/054,743

(22) Filed: Oct. 15, 2013

(65) Prior Publication Data
US 2014/0103852 A1    Apr. 17, 2014

(30) Foreign Application Priority Data
Oct. 16, 2012 (JP) .................................. 2012-229196

(51) Int. Cl.
| | | |
|---|---|---|
| H02P 7/00 | (2006.01) | |
| H02P 3/04 | (2006.01) | |
| H02H 7/085 | (2006.01) | |
| H02P 5/747 | (2006.01) | |

(52) U.S. Cl.
CPC ................ *H02P 3/04* (2013.01); *H02H 7/0852* (2013.01); *H02P 5/747* (2013.01)

(58) Field of Classification Search
CPC .... B25J 9/1689; B25J 9/1633; G05B 19/408; G05B 19/351
USPC ......... 318/34, 560, 563, 565, 568.11, 568.12, 318/568.17, 568.18, 568.2, 568.21, 569, 318/600, 400.01, 400.14, 400.15, 430, 432, 318/437, 703, 362, 371, 372, 273, 741, 742, 318/757, 799; 188/72.1, 79.52, 139, 150
See application file for complete search history.

(56) References Cited

U.S. PATENT DOCUMENTS

2012/0310411 A1*  12/2012  Tsuboi et al. .................. 700/245

FOREIGN PATENT DOCUMENTS

| | | |
|---|---|---|
| CN | 1705221 A | 12/2005 |
| CN | 101379692 A | 3/2009 |
| CN | 101641233 A | 2/2010 |
| JP | 02017237 B2 | 1/1990 |
| JP | 03166032 B2 | 7/1991 |
| JP | 07110714 A | 4/1995 |
| JP | 7328966 A | 12/1995 |
| JP | 859124 A | 3/1996 |
| JP | 2003175432 A | 6/2003 |
| JP | 20049168 A | 1/2004 |
| JP | 2007295654 A | 11/2007 |

* cited by examiner

*Primary Examiner* — Antony M Paul
(74) *Attorney, Agent, or Firm* — Lowe Hauptman & Ham, LLP

(57) ABSTRACT

A state switching unit switches the state of a motor that has caused an alarm, from an excited state to an un-excited state at an alarm generation timing. A state switch timing setting unit sets a state switch timing of switching the state of a motor other than the motor that has caused the alarm, from an excited state to an un-excited state. This setting is made on the basis of a physical quantity concerning at least one of the motor and a driven body. At the set state switch timing, a state switching unit switches the state of the motor other than the motor that has caused the alarm, from an excited state to an un-excited state.

4 Claims, 3 Drawing Sheets

MOTOR CONTROL DEVICE CONTROLLING A PLURALITY OF MOTORS THAT DRIVE ONE DRIVEN BODY

RELATED APPLICATIONS

The present application is based on and claims priority to Japanese Application Number 2012-229196, filed Oct. 16, 2012, the disclosure of which is hereby incorporated by reference herein in its entirety.

BACKGROUND OF THE INVENTION

1. Field of the Invention

The present invention relates to a motor control device for controlling a plurality of motors that drive one driven body moving along one movement shaft.

2. Description of the Related Art

In a machine tool, a robot, or the like, when at least one motor that drives one driven body moving along one movement shaft (e.g., a gravity shaft along which the driven body may moves due to gravity) is controlled, an abnormality of the motor is detected by for example temperature. Thereby, an alarm is generated, and the state of the brake that brakes the driven body is switched from a releasing state to a fastening state when a brake operation completing period of time set in advance lapses from the alarm generation timing.

When the alarm is thus generated, the motor cannot be normally controlled. Accordingly, the state of the motor needs to be switched from an excited state (driven state) to an un-excited state (un-driven state). For this purpose, the following motor control devices are proposed, for example. The first motor driving device switches the state of the motor from the excited state to the un-excited state at the first timing when an alarm occurs, as described in Japanese Patent No. 2954616, for example. The second motor control device switches the state of the motor from the excited state to the un-excited state at the second timing when the brake operation completing period of time set in advance lapses from the alarm generation timing, as described in Japanese Patent No. 2898288, for example.

Another motor control device is proposed. This motor control device controls a plurality of motors to drive the driven body by a plurality of the motors, for example, because the a size of the driven body is large so that acceleration and deceleration are difficult for one motor due to insufficient torque, as described in Japanese Laid-open Patent Publication No. H7-110714.

When one driven body is driven by a plurality of motors, generation of an alarm for one motor among a plurality of the motors prevents normal control of the motor that has caused the alarm. Accordingly, the state of the motor that has caused the alarm needs to be switched from the excited state to the un-excited state at the above-mentioned first timing, and states of the motors other than the motor that has caused the alarm need to be switched from the excited states to the un-excited states at either the above-mentioned first timing or the above-mentioned second timing.

However, according to the conventional motor control device that controls a plurality of motors for driving one driven body by these motors, the timing when states of the motors other than the motor that has caused the alarm are switched from the excited states to the un-excited states is not set on the basis of a physical quantity concerning at least one of the motor and the driven body. For this reason, at least one of the motor and a system (e.g., a feed screw mechanism including a movement shaft) associated with the motor possibly suffers an adverse effect.

For example, when controlling a plurality of motors that drive one driven body moving along one gravity shaft, when an alarm for one motor among a plurality of the motors is generated while the driven body is stationary, switching states of the motors other than the motor that has caused the alarm, from the excited states to the un-excited states at the above-mentioned first timing causes the driven body to drop before the brake operation completing period of time set in advance lapses from the alarm generation timing. As a result, the driven body possibly interferes with another object (e.g., a workpiece arranged on a table of a machine tool).

When controlling a plurality of motors that drive one driven body moving along one movement shaft, when an alarm for one motor among a plurality of the motors is generated, switching states of the motors other than the motor that has caused the alarm, from the excited states to the un-excited states at the above-mentioned second timing allows torque of the motors other than the motor that has caused the alarm, to be generated while torque of the motor that has caused the alarm is not generated. To bring acceleration of the driven body after the alarm generation to the same acceleration of the driven body before the alarm generation, magnitude of torque generated by the motors other than the motor that has caused the alarm needs to be increased after the alarm generation so as to be larger than magnitude of torque generated before the alarm generation. For example, when one driven body is driven by two motors, the motor other than the motor that has caused the alarm needs torque of which magnitude is approximately twice as large as torque generated before the alarm generation. Thus increasing magnitude of torque leads to increase in magnitude of loads of the motor and the system including the motor. As a result, the motor and the system including the motor may suffer an adverse effect.

SUMMARY OF THE INVENTION

An object of the present invention is to provide a motor control device capable of switching the state of a motor other than the motor that has caused an alarm, from an excited state to an un-excited state at an appropriate timing on the basis of a physical quantity concerning at least either the motor or a driven body, on the occasion of generating the alarm for at least one motor among a plurality of the motors that drive the one driven body moving along one movement shaft.

In order to accomplish the above-described object, a motor control device controls a plurality of motors that drive one driven body moving along one movement shaft, the motor control device including, a first physical quantity detecting unit detecting a first physical quantity concerning either the driven body or the motor when the plurality of motors are in excited states, an alarm generating unit generating an alarm for at least one motor among the plurality of motors at a first timing in accordance with a state of the motor, a first state switching unit switching the state of the motor that has caused the alarm, from an excited state to an un-excited state at the first timing, a brake commanding unit outputting, to a brake that brakes the driven body, a command for switching a state of the brake from a releasing state to a fastening state at a second timing that is a timing when a brake operation completing period of time set in advance lapses from an alarm generation timing, a state switch timing setting unit setting a state switch timing to be either the first timing or the second timing on the basis of the first physical quantity, wherein the state switch timing is a timing when the state of the motor other than the motor that has caused the alarm is switched from an excited state to an un-excited state, and a second state switching unit switching the state of the motor other than the motor that has caused the alarm, from an excited state to an un-excited state at the state switch timing.

Preferably, the first physical quantity includes at least either magnitude of torque generated, at the alarm generation timing, in the motor other than the motor that has caused the alarm, or a speed at which the one driven body moves along the one movement shaft at the alarm generation timing.

Preferably, the motor control device further includes, a second physical quantity detecting unit detecting a second physical quantity concerning the motor, before the brake operation completing period of time set in advance lapses from the alarm generation timing, and a state switch timing changing unit changing the state switch timing of the motor for which the state switch timing has been set to be the second timing, from the second timing to a third timing on the basis of the second physical quantity, wherein the third timing is a timing when the second physical quantity is detected.

Preferably, the second physical quantity includes at least either magnitude of a load applied to the motor for which the state switch timing has been set to be the second timing, or magnitude of mechanical torsion applied to the movement shaft.

Preferably, the movement shaft is a gravity shaft along which the driven body can move due to gravity.

BRIEF DESCRIPTION OF THE DRAWINGS

The present invention will be understood more clearly by referring to the following attached drawings.

DETAILED DESCRIPTION

Figure 1:
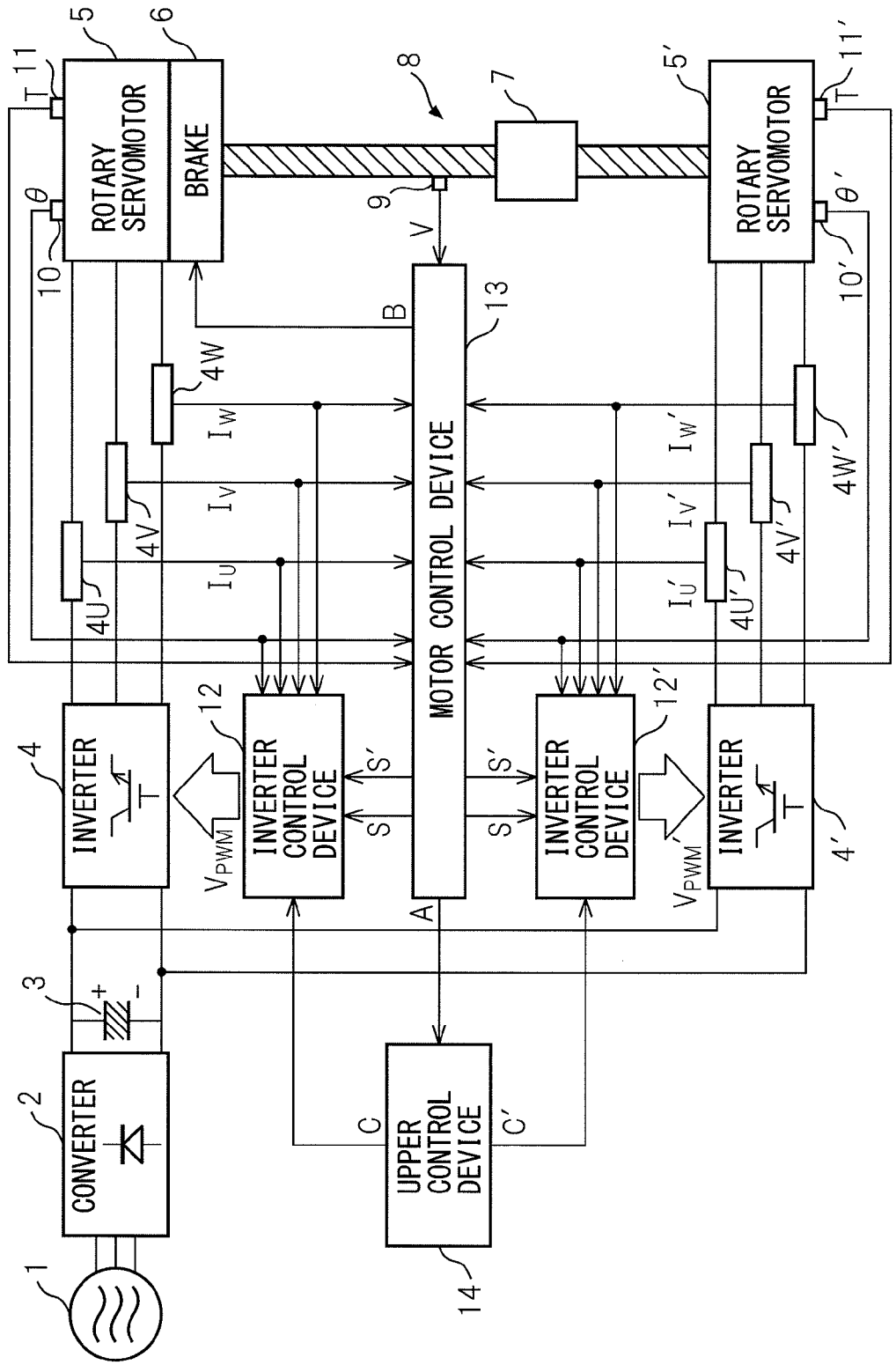
FIG. 1 is a block diagram of a system to which a motor control device is applied.

With reference to the drawings, the following describes a motor control device controlling a plurality of motors that drive one driven body. However, it is understood that the present invention is not limited to the embodiment described in the following or illustrated in the drawings.

FIG. 1 is a block diagram of a system to which the motor control device is applied. The system illustrated in FIG. 1 is used in a machine tool, a robot, or the like. The system includes a three-phase alternating current power supply 1 as an alternating current (AC) power supply, a converter 2, a smoothing capacitor 3 as a direct current (DC) link unit, inverters 4 and 4', rotary servomotors 5 and 5' as motors, a brake 6, a driven body 7, a feed screw mechanism 8, a speed detector 9, rotational angle detectors 10 and 10', temperature detectors 11 and 11', inverter control devices 12 and 12', the motor control device 13, and an upper control device 14.

The converter 2 is constituted by a plurality of (six for a three-phase alternating current) rectifier diodes, for example. The converter 2 converts AC power supplied from the three-phase alternating current power supply 1, into DC power. The smoothing capacitor 3 is connected in parallel with the converter 2, for smoothing a voltage rectified by the rectifier diodes of the converter 2. The inverter 4 is connected in parallel with the smoothing capacitor 3. The inverter 4 is constituted by a plurality of (six for a three-phase alternating current) transistors, for example. On-off operation of the transistors of the inverter 4 is performed on the basis of PWM signals $V_{PWM}$ described later so that DC power converted by the converter 2 is inverted into AC power. The inverter 4' is connected in parallel with the smoothing capacitor 3. The inverter 4' is constituted by a plurality of (six for a three-phase alternating current) transistors, for example. On-off operation of the transistors of the inverter 4' is performed on the basis of PWM signals $V_{PWM'}$ described later so that DC power converted by the converter 2 is inverted into AC power.

The rotary servomotors 5 and 5' drive the one driven body 7 moving along one gravity shaft (Z axis) as one movement shaft. According to the present embodiment, the rotary servomotor 5 functions as a main motor for performing at least one of position control and speed control, and the rotary servomotor 5' functions as a sub-motor for performing torque control. To stably control the rotary servomotor 5', at least one of position control and speed control of the rotary servomotor 5' may be performed.

The brake 6 brakes the driven body 7 in accordance with a brake command B described later. The feed screw mechanism 8 is constituted by a ball-screw-and-nut mechanism or the like. The feed screw mechanism 8 is driven by the rotary servomotors 5 and 5' to move the driven body 7 along the one gravity shaft. The speed detector 9 is constituted by a scale for detecting a dropping speed V of the driven body 7. The speed detector 9 is installed at the feed screw mechanism 8.

The rotational angle detector 10 is constituted by a rotary encoder. The rotational angle detector 10 is installed at the rotary servomotor 5 to detect a rotational angle θ of the rotary servomotor 5. The rotational angle detector 10' is constituted by a rotary encoder. The rotational angle detector 10' is installed at the rotary servomotor 5' to detect a rotational angle θ of the rotary servomotor 5'.

The temperature detector 11 is constituted by either a thermistor or a thermostat. The temperature detector 11 is arranged near the rotary servomotor 5 to detect a temperature T of the rotary servomotor 5. The temperature detector 11' is constituted by either a thermistor or a thermostat. The temperature detector 11' is arranged near the rotary servomotor 5' to detect a temperature T' of the rotary servomotor 5'.

The inverter control device 12 samples, as current value data of the rotary servomotor 5, respective current values of a U-phase current $I_U$, a V-phase current $I_V$, and a W-phase current $I_W$ of the three phases detected by current detectors 4U, 4V, and 4W that are provided at output lines of the inverter 4, and samples each rotational angle θ as position data or speed data of the motor to control the inverter 4.

From the sampled current value data, the sampled position data or speed data of the motor, and the below-described position command C or speed command C of the motor, the inverter control device 12 generates PWM signals $V_{PWM}$ for driving the rotary servomotor 5. The current detectors 4U, 4V, and 4W are constituted by Hall elements, respectively.

The inverter control device 12' samples, as current value data of the rotary servomotor 5', respective current values of a U-phase current $I_U'$, a V-phase current $I_V'$, and a W-phase current $I_W'$ of the three phases detected by current detectors 4U', 4V', and 4W' that are provided at output lines of the inverter 4', and samples each rotational angle θ' as position data or speed data of the motor to control the inverter 4'.

From the sampled current value data, the sampled position data or speed data of the motor, and the below-described position command C' or speed command C' of the motor, the inverter control device 12' generates PWM signals $V_{PWM}'$ for driving the rotary servomotor 5'. The current detectors 4U', 4V', and 4W' are constituted by Hall elements, respectively.

Figure 2:
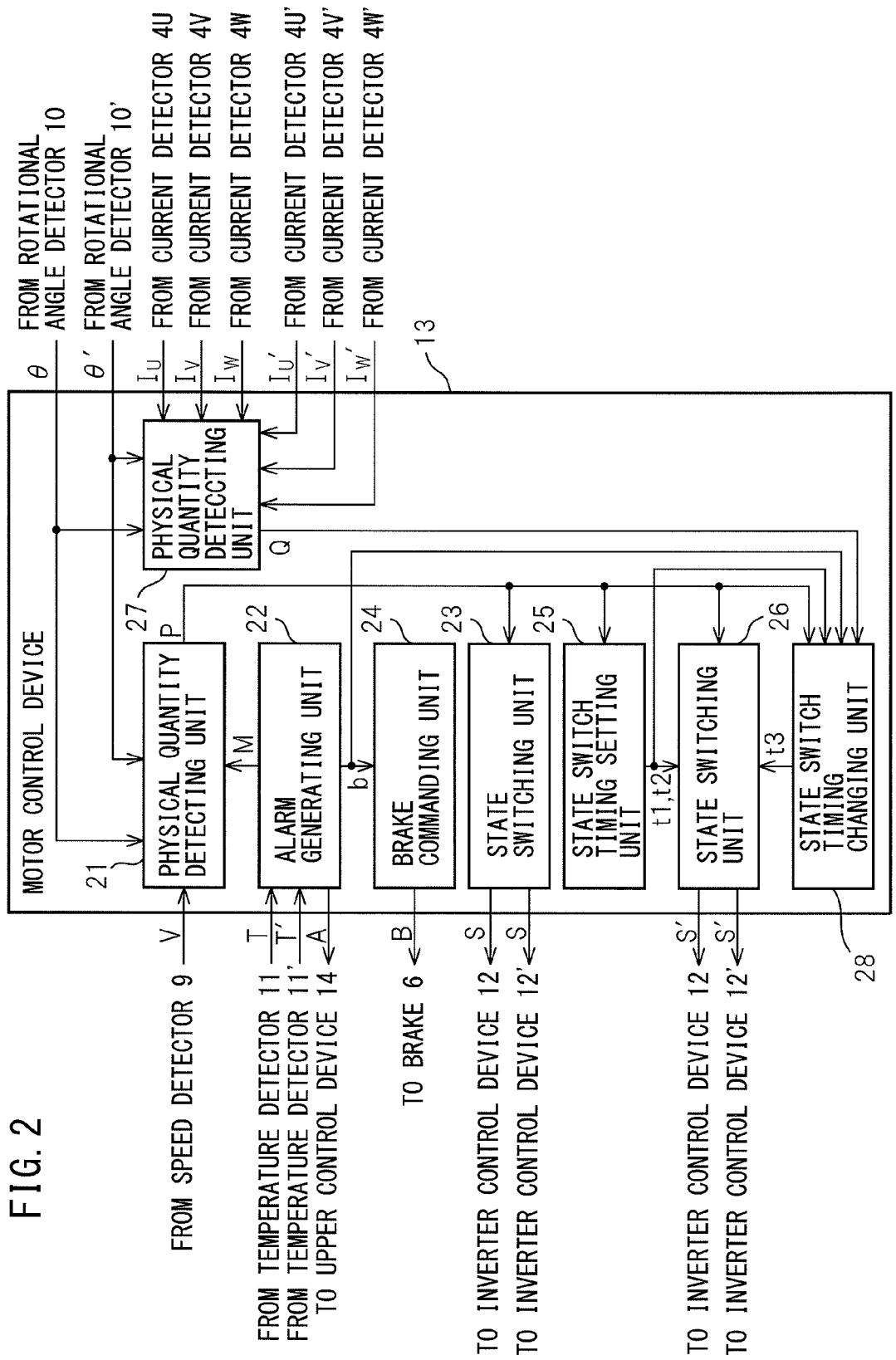
FIG. 2 is a block diagram of the motor control device in FIG. 1.

FIG. 2 is a block diagram of the motor control device in FIG. 1. When the motor control device 13 generates an alarm for one of the rotary servomotors 5 and 5', the motor control device 13 switches the state of the other of the rotary servomotors 5 and 5' from an excited state to an un-excited state at an appropriate timing on the basis of the below-described motor-and-physical-quantity information P. For this purpose, the motor control device 13 includes a physical quantity detecting unit 21 as a first physical quantity detecting unit, an alarm generating unit 22, a state switching unit 23 as a first state switching unit, a brake commanding unit 24, a state switch timing setting unit 25, a state switching unit 26 as a second state switching unit, a physical quantity detecting unit 27 as a second physical quantity detecting unit, and a state switch timing changing unit 28.

The physical quantity detecting unit 21 detects rotational acceleration a and a' of the rotary servomotors 5 and 5' as first physical quantities concerning the motor, to detect magnitude of torque generated in the rotary servomotor other than the rotary servomotor that has caused an alarm, when the alarm is generated while the rotary servomotors 5 and 5' are in excited states. For this purpose, rotational angles θ and θ' are input to the physical quantity detecting unit 21 from the rotational angle detectors 10 and 10', respectively. On the basis of the rotational angles θ and θ', the physical quantity detecting unit 21 calculates rotational acceleration a and a'. On the basis of either the rotational acceleration a or the rotational acceleration a', the physical quantity detecting unit 21 calculates magnitude of torque generated in the rotary servomotor other than the rotary servomotor that has caused an alarm.

The physical quantity detecting unit 21 detects a dropping speed V of the driven body 7 as a first physical quantity concerning the driven body. The dropping speed V is a speed at which the driven body 7 moves along the gravity shaft when an alarm is generated while the rotary servomotors 5 and 5' are in excited states. For the purpose of such detection, the dropping speed V of the driven body 7 is input to the physical quantity detecting unit 21 from the speed detector 9.

The physical quantity detecting unit 21 outputs the motor-and-physical-quantity information P to the state switching unit 23, the state switch timing setting unit 25, and the state switch timing changing unit 28. The motor-and-physical-quantity information P relates to the rotary servomotor that has caused an alarm, the rotary servomotor other than the rotary servomotor that has caused the alarm, and an physical quantity (in this case, either a dropping speed V of the driven body 7 or magnitude of torque generated in the rotary servomotor other than the rotary servomotor that has caused the alarm) detected when the rotary servomotors 5 and 5' are in excited states.

The alarm generating unit 22 generates an alarm for at least one of the rotary servomotor 5 and the rotary servomotor 5', in accordance with states of the rotary motors. For this purpose, a temperature T of the rotary servomotor 5 and a temperature T' of the rotary servomotor 5' are input to the alarm generating unit 22 from the temperature detectors 11 and 11', respectively. On the basis of the temperatures T and T', the alarm generating unit 22 determines whether or not the rotary servomotors 5 and 5' are abnormal. When the alarm generating unit 22 determines that at least one of the rotary servomotors 5 and 5' is abnormal, the alarm generating unit 22 outputs an alarm signal A to the upper control device 14, provides, to the physical quantity detecting unit 21, motor information M concerning the motor that has caused an alarm, and outputs a brake state switching signal b to the brake commanding unit 24 and the state switch timing changing unit 28.

The state switching unit 23 specifies the rotary servomotor that has caused an alarm, on the basis of the motor-and-physical-quantity information P. The state switching unit 23 switches the state of the specified rotary servomotor from an excited state to an un-excited state at a state switch timing t1 as a first timing that is the alarm generation timing. For this purpose, when the state switching unit 23 determines that abnormality exists only in the rotary servomotor 5, the state switching unit 23 outputs a state switching signal S only to the inverter control device 12. Accordingly, in response to the state switching signal S, the inverter control device 12 performs on-off control of the transistors of the inverter 4 such that the state of the rotary servomotor 5 is switched from an excited state to an un-excited state at the state switch timing t1. When the state switching unit 23 determines that abnormality exists only in the rotary servomotor 5', the state switching unit 23 outputs a state switching signal S only to the inverter control device 12'. Accordingly, in response to the state switching signal S, the inverter control device 12' performs on-off control of the transistors of the inverter 4' such that the state of the rotary servomotor 5' is switched from an excited state to an un-excited state at the state switch timing t1. Further, when the state switching unit 23 determines that abnormality exists in both of the rotary servomotor 5 and the rotary servomotor 5', the state switching unit 23 outputs a state switching signal S to both of the inverter control device 12 and the inverter control device 12'. Accordingly, in response to the state switching signal S, the inverter control device 12 performs on-off control of the transistors of the inverter 4 such that the state of the rotary servomotor 5 is switched from an excited state to an un-excited state at the state switch timing t1, and in response to the state switching signal S, the inverter control device 12' performs on-off control of the transistors of the inverter 4' such that the state of the rotary servomotor 5' is switched from an excited state to an un-excited state at the state switch timing t1.

The brake commanding unit 24 outputs a brake command B to the brake 6 in response to a brake state switching signal b to switch the state of the brake 6 braking the driven body 7 from a releasing state to a fastening state at a state switch timing t2 as a second timing that is the timing when a brake operation completing period (period before the brake 6 steadily operates) of time set in advance lapses from the alarm generation timing.

The state switch timing setting unit 25 specifies the rotary servomotor other than the rotary servomotor that has caused an alarm, on the basis of the motor-and-physical-quantity information P. The state switch timing setting unit 25 sets a timing of switching the state of the specified rotary servomotor from an excited state to an un-excited state, to be either the state switch timing t1 or the state switch timing t2, on the basis of at least one of rotational speeds ω and ω' and a dropping speed V of the driven body 7. Then, the state switch timing setting unit 25 communicates either the state switch timing t1 or state switch timing t2 to the state switching unit 26 and the state switch timing changing unit 28.

The state switching unit 26 specifies the rotary servomotor other than the rotary servomotor that has caused an alarm, on the basis of the motor-and-physical-quantity information P. The state switching unit 26 switches the state of the specified rotary servomotor from an excited state to an un-excited state at the timing that is set by the state switch timing setting unit 25 and that is either the state switch timing t1 or the state switch timing t2. For this purpose, when the rotary servomotor 5 is the rotary servomotor other than the rotary servomotor that has caused an alarm, the state switching unit 26 outputs a state switching signal S' only to the inverter control device 12. In response to the state switching signal S', the inverter control device 12 performs on-off control of the transistors of the inverter 4 such that the state of the rotary servomotor 5 is switched from an excited state to an un-excited state at the timing that is set by the state switch timing setting unit 25 and that is either the state switch timing t1 or the state switch timing t2. When the rotary servomotor 5' is the rotary servomotor other than the rotary servomotor that has caused an alarm, the state switching unit 26 outputs a state switching signal S' only to the inverter control device 12'. In response to the state switching signal S', the inverter control device 12' performs on-off control of the transistors of the inverter 4' such that the state of the rotary servomotor 5' is switched from an excited state to an un-excited state at the timing that is set by the state switch timing setting unit 25 and that is either the state switch timing t1 or the state switch timing t2.

The physical quantity detecting unit 27 detects, as a second physical quantity concerning the motor, magnitude of a load applied to the rotary servomotor for which the state switch timing t2 has been set, before the brake operation completing period of time set in advance lapses from the alarm generation timing. For this purpose, U-phase currents $I_U$ and $I_U'$, V-phase currents $I_V$ and $I_V'$, and W-phase currents $I_W$ and $I_W'$ are input to the physical quantity detecting unit 27 from current detectors 4U, 4U', 4V, 4V', 4W and 4W', respectively. On the basis of the U-phase currents $I_U$ and $I_U'$, V-phase currents $I_V$ and $I_V'$, and W-phase currents $I_W$ and $I_W'$, the physical quantity detecting unit 27 calculates magnitude of a load applied to the rotary servomotor for which the state switch timing t2 has been set.

The physical quantity detecting unit 27 detects, as the second physical quantity concerning the motor, magnitude of mechanical torsion applied to the gravity shaft, before the brake operation completing period of time set in advance lapses from the alarm generation timing. For this purpose, rotational angles θ and θ' are input to the physical quantity detecting unit 27 from the rotational angle detectors 10 and 10', respectively. On the basis of the rotational angles θ and θ', the physical quantity detecting unit 27 calculates magnitude of mechanical torsion applied to the gravity shaft. For example, on the basis of an absolute value of a difference between the rotational angle θ and the rotational angle θ', the physical quantity detecting unit 27 calculates magnitude of mechanical torsion applied to the gravity shaft.

The physical quantity detecting unit 27 outputs, to the state switch timing changing unit 28, physical quantity information Q concerning the second physical quantity (in this case, either a load applied to the rotary servomotor for which the state switch timing t2 has been set or magnitude of mechanical torsion applied to the gravity shaft) detected before the brake operation completing period of time set in advance lapses from the alarm generation timing.

The state switch timing changing unit 28 changes a state switch timing of the rotary servomotor for which the state switch timing t2 has been set, from the state switch timing t2 to a state switch timing t3 as a third timing that is a timing of detecting the second physical quantity (in this case, at least either a load applied to the rotary servomotor for which the state switch timing t2 has been set or magnitude of mechanical torsion applied to the gravity shaft), in accordance with the motor-and-physical quantity information P and the physical quantity information Q.

The state switch timing changing unit 28 sets a timer not illustrated in the drawings in response to the brake state switching signal b. On the basis of a count value of the timer, the state switch timing changing unit 28 determines whether or not the brake operation completing period of time lapses.

According to the present embodiment, the physical quantity detecting unit 21, the alarm generating unit 22, the state switching unit 23, the brake commanding unit 24, the state switch timing setting unit 25, the state switching unit 26, the physical quantity detecting unit 27, and the state switch timing changing unit 28 are embodied by a processor including an input-output port, a serial communication circuit, an A/D converter, a comparator, and the like, and perform the below-described process in accordance with a process program stored in a memory not illustrated in the drawings.

The upper control device 14 is constituted by a computer numerical control (CNC) device. The upper control device 14 inputs the above-described position commands C and C' or speed commands C and C' to the inverter control devices 12 and 12', respectively.

Figure 3:
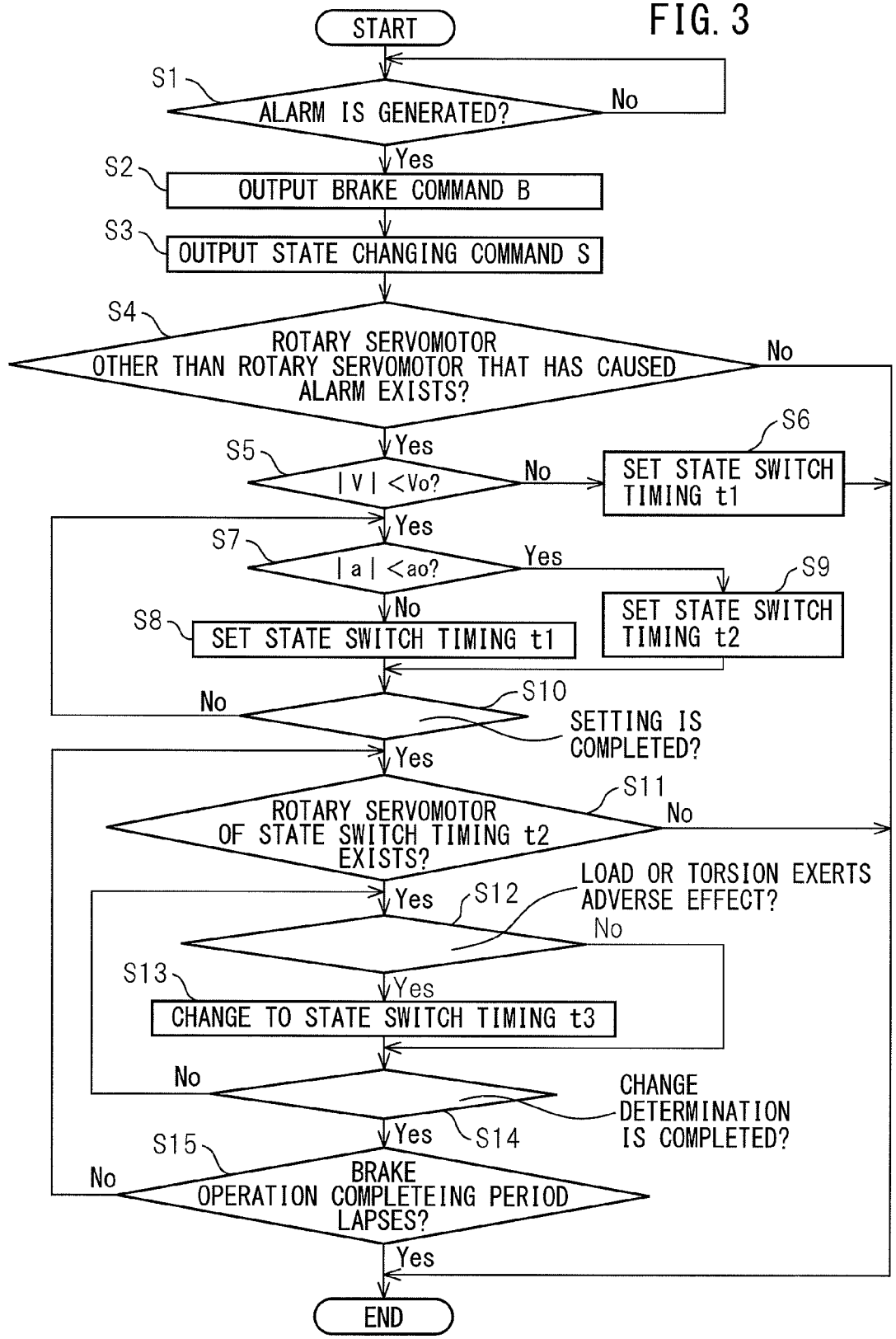
FIG. 3 is a flowchart of operation of the motor control device.

FIG. 3 is a flowchart of operation of the motor control device 13. This flowchart is implemented when states of the rotary servomotors 5 and 5' are switched from un-excited states to excited states. The flowchart is controlled by the process program that is executed by the motor control device 13.

First, on the basis of whether the physical quantity detecting unit 21 receives motor information M or not, the physical quantity detecting unit 21 determines whether or not the alarm generating unit 22 outputs an alarm signal A to the upper control device 14, and on the basis of whether a brake state switching signal b is input to the brake commanding unit 24 or not, the brake commanding unit 24 determines whether or not the alarm generating unit 22 outputs an alarm signal A to the upper control device 14 (step S1). When the alarm generating unit 22 outputs an alarm signal A to the upper control device 14, i.e., when the brake state switching signal b is input to the brake commanding unit 24, the brake commanding unit 24 outputs a brake command B to the brake 6 (step S2), and the physical quantity detecting unit 21 outputs a state changing command S to the rotary servomotor that has caused the alarm (step S3).

After the step S3 is ended, the physical quantity detecting unit 21 determines whether or not the rotary servomotor other than the rotary servomotor that has caused the alarm exists, on the basis of the motor information M (step S4). When the rotary servomotor other than the rotary servomotor that has caused the alarm does not exist, the process flow is ended. Meanwhile, when the rotary servomotor other than the rotary servomotor that has caused the alarm exists, the physical quantity detecting unit 21 determines whether or not an absolute value |V| of a dropping speed V of the driven body 7 is smaller than a value Vo set in advance (step S5), to determine whether or not the driven body 7 is stationary.

When the absolute value |V| is equal to or larger than the value Vo set in advance, the physical quantity detecting unit 21 determines that the driven body 7 is moving along a vertical shaft, and provides, to the state switch timing setting unit 25, the motor-and-physical-quantity information P including information that indicates that the driven body 7 is moving along the vertical shaft. On the basis of the motor-and-physical-quantity information P, the state switch timing setting unit 25 sets a state switch timing of every rotary servomotor other than the rotary servomotor that has caused the alarm, to be the state switch timing t1, and communicates the state switch timing t1 to the state switching unit 26 (step S6). In this case, at the state switch timing t1, the state switching unit 26 outputs a state changing command S' to every rotary servomotor other than the rotary servomotor that has caused the alarm.

When the absolute value |V| of the dropping speed V is smaller than the value Vo set in advance, the physical quantity detecting unit 21 determines that the driven body 7 is stationary. Then, the physical quantity detecting unit 21 determines whether or not an absolute value |a| of rotational acceleration a of one rotary servomotor that is among the rotary servomotors other than the rotary servomotor having caused the alarm and for which a state switch timing has not been set is smaller than a value ao set in advance (step S7), to determine whether or not torque generated by each rotary servomotor other than the rotary servomotor that has caused the alarm has magnitude exerting an adverse effect on the feed screw mechanism 8. In this case, the physical quantity detecting unit 21 calculates the rotational acceleration a on the basis of either a rotational angle θ or a rotational angle θ'.

When the absolute value |a| of the rotational acceleration a is equal to or larger than the value ao set in advance, the physical quantity detecting unit 21 determines that torque generated by one rotary servomotor for which a state switch timing has not been set has magnitude exerting an adverse effect on the feed screw mechanism 8. Accordingly, the physical quantity detecting unit 21 provides, to the state switch timing setting unit 25, motor-and-physical-quantity information P that includes information indicating that the driven body 7 is stationary, and includes information indicating that torque generated by the rotary servomotor concerned has magnitude exerting an adverse effect on the feed screw mechanism 8. On the basis of the motor-and-physical-quantity information P, the state switch timing setting unit 25 sets a state switch timing of the rotary servomotor concerned, to be the state switch timing t1, and communicates the state switch timing t1 to the state switching unit 26 (step S8). In this case, at the state switch timing t1, the state switching unit 26 outputs the state changing command S' to the rotary servomotor concerned.

When the absolute value |a| of the rotational acceleration a is smaller than the value ao set in advance, the physical quantity detecting unit 21 determines that torque generated by one rotary servomotor for which a state switch timing has not been set does not have magnitude exerting an adverse effect on the feed screw mechanism 8. Accordingly, the physical quantity detecting unit 21 provides, to the state switch timing setting unit 25, motor-and-physical-quantity information P that includes information indicating that the driven body 7 is stationary, and includes information indicating that torque generated by the rotary servomotor concerned does not have magnitude exerting an adverse effect on the feed screw mechanism 8. On the basis of the motor-and-physical-quantity information P, the state switch timing setting unit 25 sets a state switch timing of the rotary servomotor concerned, to be the state switch timing t2, and communicates the state switch timing t2 to the state switching unit 26 (step S9). In this case, at the state switch timing t2, the state switching unit 26 outputs the state changing command S' to the rotary servomotor concerned.

After the step S8 or the step S9 is ended, the state switch timing setting unit 25 determines whether or not the setting of a state switch timing of every rotary servomotor other than the rotary servomotor that has caused the alarm is completed (step S10). When the setting of a state switch timing is not completed, the process returns to the step S7. When the setting of a state switch timing is completed, the state switch timing changing unit 28 determines whether or not the rotary servomotor for which the state switch timing t2 has been set exists, on the basis of the motor-and-physical-quantity information P and the physical quantity information Q (step S11).

When the rotary servomotor for which the state switch timing t2 has been set does not exist, the process flow is ended. Meanwhile, when the rotary servomotor for which the state switch timing t2 has been set exists, on the basis of the physical quantity information Q, the state switch timing changing unit 28 determines whether or not a load applied to one rotary servomotor for which confirmation of whether a state switch timing needs to be changed or not has not been made has magnitude exerting an adverse effect on operation of the rotary servomotor, and determines whether or not mechanical torsion applied to the gravity shaft has magnitude exerting an adverse effect on the feed screw mechanism 8 (step S12), to determine whether or not the state switch timing t2 needs to be changed to the state switch timing t3.

When a load applied to the one rotary servomotor concerned has magnitude exerting an adverse effect on operation of the rotary servomotor, or mechanical torsion applied to the gravity shaft has magnitude exerting an adverse effect on the feed screw mechanism 8, the state switch timing changing unit 28 changes the state switch timing t2 of the rotary servomotor concerned to the state switch timing t3 (step S13). Then, the state switch timing changing unit 28 determines whether or not the determination of whether the state switch timing t2 for every rotary servomotor for which the state switch timing t2 has been set is changed to the state switch timing t3 or not is completed (step S14). When a load applied to the one rotary servomotor concerned does not have magnitude exerting an adverse effect on operation of the rotary servomotor, and mechanical torsion applied to the gravity shaft does not have magnitude exerting an adverse effect on the feed screw mechanism 8, the process proceeds to the step S14.

When the determination of whether the state switch timing t2 for every rotary servomotor for which the state switch timing t2 has been set is changed to the state switch timing t3 or not is not completed, the process returns to the step S12. When the determination of whether the state switch timing t2 for every rotary servomotor for which the state switch timing t2 has been set is changed to the state switch timing t3 or not is completed, the state switch timing changing unit 28 determines whether or not the brake operation completing period of time lapses (step S15). When the brake operation completing period of time lapses, the process is ended. When the brake operation completing period of time does not lapse, the process returns to the step S11.

According to the present embodiment, when the driven body 7 is stationary, and torque generated by the rotary servomotor other than the rotary servomotor that has caused an alarm does not have magnitude exerting an adverse effect on the feed screw mechanism 8, the state of the rotary servomotor concerned is switched from an excited state to an un-excited state at the state switch timing t2. Accordingly, it is possible to avoid a situation in which before the brake operation completing period of time set in advance lapses from the alarm generation timing, the driven body 7 drops, and the driven body 7 interferers with a different object.

Further, according to the present embodiment, when the driven body 7 is stationary, and torque generated by the rotary servomotor other than the rotary servomotor that has caused an alarm has magnitude exerting an adverse effect on the feed screw mechanism 8, the state of the rotary servomotor concerned is switched from an excited state to an un-excited state at the state switch timing t1. Accordingly, it is possible to avoid a situation in which torque generated by the rotary servomotor concerned exerts an adverse effect on the feed screw mechanism 8.

Furthermore, according to the present embodiment, when a load applied to one rotary servomotor for which the state switch timing t2 has been set has magnitude exerting an adverse effect on operation of the rotary servomotor, or mechanical torsion applied to the gravity shaft has magnitude exerting an adverse effect on the feed screw mechanism 8, a state switch timing of the rotary servomotor concerned is changed from the state switch timing t2 to the state switch timing t3. Accordingly, it is possible to avoid a situation in which an adverse effect is exerted on operation of the rotary servomotor and on the feed screw mechanism 8.

Therefore, according to the present embodiment, when an alarm is generated for at least one of a plurality of rotary servomotors 5 and 5' that drives one driven body 7 moving along one vertical shaft, the state of the rotary servomotor other than the rotary servomotor that has caused the alarm can be switched from an excited state to an un-excited state at an appropriate timing, on the basis of a physical quantity concerning the motor.

The present invention is not limited to the above embodiment. Many alterations and modifications may be made. For example, although the three-phase alternating current power supply 1 is used as an AC power supply in the above embodiment, a polyphase alternating current power supply other than three-phase alternating current power supply may be used as a power supply.

Further, although the case of using rotary servomotors as motors is described in the above embodiment, linear servomotors, vibration-type servomotors, or the like may be used instead of rotary servomotors.

The rotational angle detectors 10 and 10' may be constituted by components (e.g., Hall elements or resolvers) other than rotary encoders. Further, the rotational angle detectors 10 and 10' may be omitted, and rotational angles θ and θ' may be calculated from AC currents and AC voltages supplied to the rotary servomotors 5 and 5'. Instead of detecting magnitude of torque of the rotary servomotors 5 and 5' from rotational acceleration a and a', magnitude of torque of the rotary servomotors 5 and 5' may be detected from U-phase currents $I_U$ and $I_U'$, V-phase currents $I_V$ and $I_V'$, and W-phase currents $I_W$ and $I_W'$, or from current commands thereof. Rotational acceleration a and a' may be calculated from rotational speeds ω and ω' of the rotary servomotors 5 and 5' detected by speed detectors that are additionally arranged and not illustrated in the drawings, or may be detected by acceleration detectors. Instead of detecting a dropping speed V of the driven body 7 by using the speed detector 9, a dropping speed V of the driven body 7 may be calculated from rotational speeds ω and ω' calculated from rotational angles θ and θ'. Each of switch timings when states of the rotary servomotors 5 and 5' are switched from excited states to un-excited states may be set to be one of the above-described first timing, the above-described second timing, and the above-described third timing, on the basis of a physical quantity other than the above-described first physical quantity or the above-described second physical quantity that includes a dropping speed V of the driven body 7, rotational speeds ω and ω' of the rotary servomotors 5 and 5', rotational acceleration a and a' of the rotary servomotors 5 and 5', magnitude of loads of the rotary servomotors 5 and 5', temperatures of the rotary servomotors 5 and 5', and/or magnitude of mechanical torsion applied to the feed screw mechanism 8 described in the above embodiment.

Further, although the case of using two motors is described in the above embodiment, three or more motors may be used. In this case, one of the three or more motors functions as a main motor for performing at least one of position control and speed control, and the other motors function as sub-motors for performing torque control. To stably control each motor, at least one of position control and speed control may be performed on the sub-motors, as with the main motor.

According to the present invention, when an alarm is generated for at least one of a plurality of motors that drive one driven body moving along one movement shaft, the state of the motor other than the motor that has caused the alarm can be switched from an excited state to an un-excited state at an appropriate timing on the basis of a physical quantity concerning at least one of the motor and the driven body.

The invention claimed is:

1. A motor control device controlling a plurality of motors that drive one driven body moving along one movement shaft, the motor control device comprising:
   a first physical quantity detecting unit which detects a first physical quantity concerning either the driven body or the motor when the plurality of motors are in excited states;
   an alarm generating unit which generates an alarm for at least one motor among the plurality of motors at a first timing in accordance with a state of the motor;
   a first state switching unit which switches the state of the motor that has caused the alarm, from an excited state to an un-excited state at the first timing;
   a brake commanding unit which outputs, to a brake that brakes the driven body, a command for switching a state of the brake from a releasing state to a fastening state at a second timing that is a timing when a brake operation completing period of time set in advance lapses from an alarm generation timing;
   a state switch timing setting unit which sets a state switch timing to be either the first timing or the second timing on the basis of the first physical quantity, wherein the state switch timing is a timing when the state of the motor other than the motor that has caused the alarm is switched from an excited state to an un-excited state; and
   a second state switching unit which switches the state of the motor other than the motor that has caused the alarm, from an excited state to an un-excited state at the state switch timing, wherein
   when the first physical quantity is at least either a magnitude of torque generated by a motor other than the motor that has caused an alarm during the generation of the alarm, or a moving speed of the driven body moving along the moving shaft during the generation of the alarm, said state switch timing setting unit sets said state switch timing to said first timing when said magnitude of torque becomes more than or equal to a first predetermined value or said speed becomes more than or equal to a second predetermined value, and sets said state switch timing to said second timing when said magnitude of torque becomes lower than said first predetermined value and said speed becomes lower than said second predetermined value.

2. The motor control device according to claim 1, further comprising:
   a second physical quantity detecting unit which detects a second physical quantity concerning the motor, before the brake operation completing period of time set in advance lapses from the alarm generation timing; and
   a state switch timing changing unit which changes the state switch timing of the motor for which the state switch timing has been set to be the second timing, from the second timing to a third timing on the basis of the second physical quantity, wherein the third timing is a timing when the second physical quantity is detected, wherein
   when the second physical quantity is at least either a magnitude of a load applied to the motor for which said state switch timing has been set to be the second timing, or a magnitude of mechanical torsion applied to the movement shaft, said state switch timing changing unit sets said state switch timing to said third timing when said magnitude of the load becomes more than or equal to a third predetermined value or said magnitude of mechanical torsion becomes more than or equal to a fourth predetermined value.

3. The motor control device according to claim 2, wherein said third predetermined value has a magnitude exerting an adverse effect on the movement of the motor other than the motor that has caused the alarm; and said fourth predetermined value is the same as the mechanical torsion applied to the movement shaft having a magnitude exerting an adverse effect on a moving mechanism of said driven body.

4. The motor control device according to claim 1, wherein the movement shaft is a gravity shaft along which the driven body is moveable by influence of gravity.

* * * * *